(12) United States Patent
Pardon

(10) Patent No.: US 11,810,122 B2
(45) Date of Patent: Nov. 7, 2023

(54) METHOD AND SYSTEM FOR ROBUST COMMUNICATION

(71) Applicant: Guy Pardon, Mechelen (BE)

(72) Inventor: Guy Pardon, Mechelen (BE)

(*) Notice: Subject to any disclaimer, the term of this patent is extended or adjusted under 35 U.S.C. 154(b) by 412 days.

(21) Appl. No.: 17/301,620

(22) Filed: Apr. 9, 2021

(65) Prior Publication Data
US 2021/0326895 A1 Oct. 21, 2021

(30) Foreign Application Priority Data

Apr. 15, 2020 (CH) .................................... 00449/20

(51) Int. Cl.
| | |
|---|---|
| *G06F 9/44* | (2018.01) |
| *G06Q 20/42* | (2012.01) |
| *G06Q 10/0637* | (2023.01) |
| *G06Q 20/40* | (2012.01) |
| *H04L 69/28* | (2022.01) |
| *G06F 9/46* | (2006.01) |
| *G06F 9/54* | (2006.01) |

(52) U.S. Cl.
CPC ........... *G06Q 20/425* (2013.01); *G06F 9/466* (2013.01); *G06F 9/546* (2013.01); *G06Q 10/0637* (2013.01); *G06Q 20/401* (2013.01); *G06Q 20/407* (2013.01); *H04L 69/28* (2013.01); *G06F 2209/541* (2013.01)

(58) Field of Classification Search
CPC .................................................. G06Q 20/425
USPC ........................................................ 719/320
See application file for complete search history.

(56) References Cited

U.S. PATENT DOCUMENTS

| | | | |
|---|---|---|---|
| 6,671,686 B2 | 12/2003 | Pardon | |
| 8,005,805 B2 | 8/2011 | Pardon | |
| 8,463,761 B2 | 6/2013 | Pardon | |
| 10,942,823 B2 | 3/2021 | Pardon | |
| 2010/0318654 A1* | 12/2010 | Paramasivam | G06Q 10/06 709/225 |
| 2013/0117755 A1* | 5/2013 | Bontempi | G06F 9/5027 718/103 |
| 2014/0337303 A1 | 11/2014 | Little | |
| 2015/0120531 A1* | 4/2015 | Stridh | G06Q 20/027 705/39 |
| 2019/0068436 A1 | 2/2019 | Cheng | |

FOREIGN PATENT DOCUMENTS

EP 3 208 998 A1 8/2017

* cited by examiner

*Primary Examiner* — Timothy A Mudrick
(74) *Attorney, Agent, or Firm* — Oppedahl Patent Law Firm LLC

(57) ABSTRACT

A method for robust communication between a client (1) and a server (2), for performing a transaction, comprises the steps of the client (1) initiating, through a transaction request (21), a transaction to be performed by the server computer (2), waiting (13) for a transaction confirmation request (22) from the server computer (2), and when receiving the response, sending a transaction confirmation response (23). After sending the transaction confirmation response (23), the client device (1) is not free to abort the transaction but is forced to wait for and accept a transaction result message (24) from the server computer (2), or, in the case of a server-side failure, a server-side transaction abort message (25).

19 Claims, 2 Drawing Sheets

METHOD AND SYSTEM FOR ROBUST COMMUNICATION

The invention relates to the field of transactional data processing systems. It relates to a method for robust communication between a client and a server for performing a transaction, and corresponding methods being executed in the client device and the server computer.

Swiss patent application number 00449/20 filed Apr. 15, 2020 is incorporated herein by reference for all purposes.

An issue in transactional systems is that communication between participating computers is not always reliable. For example, with a client being a mobile device there may be a temporary loss of communication depending on the location of the client. If this happens during a transaction, such as an order for goods or money transactions, it is vital to ensure that both the client and a server it communicates with arrive at the same outcome of the transaction. Also, a client may believe that an order has not been received by the server and triggers the order a second time—either by a user action or by a software process responsible for the order. This may result in multiple executions of the same transaction.

It is therefore an object of the invention to create a method for robust communication between a client and a server of the type mentioned initially, which solves the problems mentioned above.

These objects are achieved by a method for robust communication between a client and a server according to the claims.

In an embodiment, a computer program product for the method described herein is loadable into an internal memory of a digital computer or a computer system constituting the client device or the server computer described herein, and comprises computer-executable instructions to cause one or more processors of client device or the server computer, respectively, to execute the respective steps of the method. In another embodiment, the computer program product comprises a computer readable medium having the computer-executable instructions recorded thereon. The computer readable medium preferably is non-transitory; that is, tangible. In still another embodiment, the computer program is embodied as a reproducible computer-readable signal, and thus can be transmitted in the form of such a signal.

Further embodiments are evident from the dependent patent claims. Features of the method claims may be combined with features of the device claims and vice versa.

Figure 1:
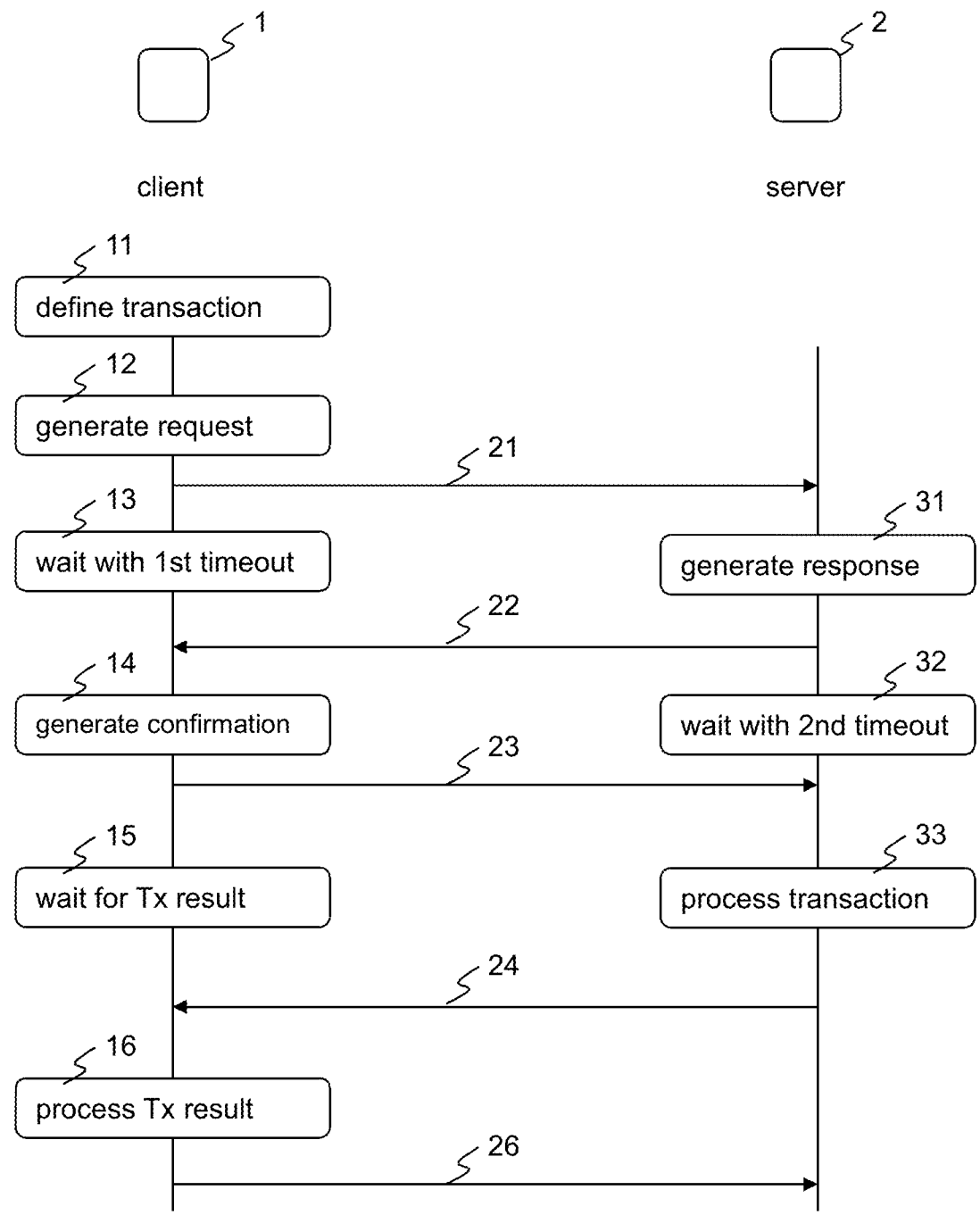
Figure 2:
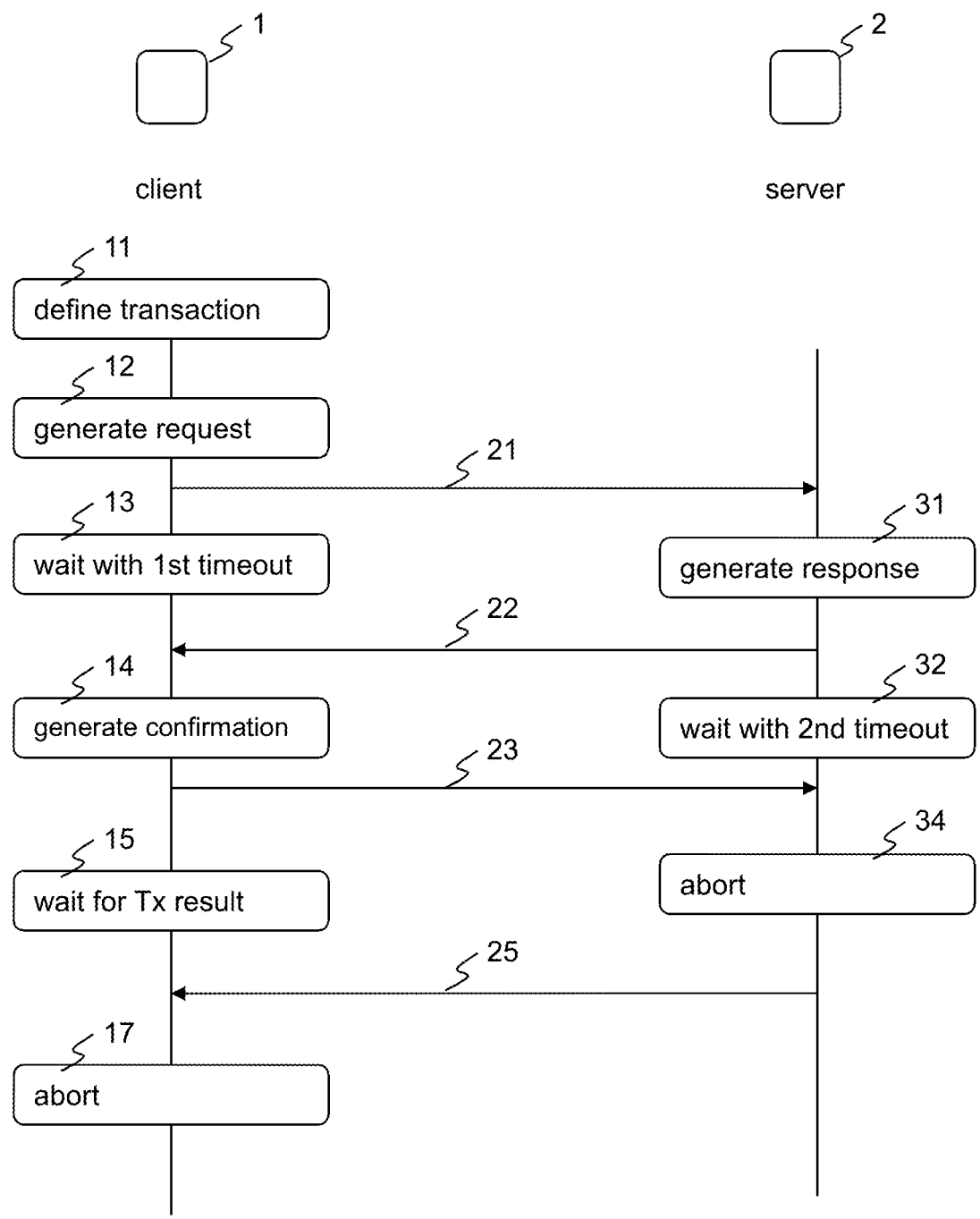

The subject matter of the invention will be explained in more detail in the following text with reference to exemplary embodiments which are illustrated in the attached drawings, which schematically show:

FIG. 1 a client device and server computer and a sequence diagram of their interaction in the case of a successful transaction;

FIG. 2 the same, in the case of an unsuccessful transaction.

The reference symbols used in the drawings, and their meanings, are listed in summary form in the list of reference symbols. In principle, identical parts are provided with the same reference symbols in the figures.

FIG. 1 schematically shows a sequence diagram of the method for robust communication between a client 1 and a server 2, for performing a transaction. Both the client device 1 and server computer 2 are computerised devices, typically comprising digital data processing units. Typically, the client device 1 comprises a user interface and/or a communications interface for communicating with another data processing device.

The method comprises the step of
the client, based on user input, determining 11 a specification of a transaction;

In embodiments, the client is a software application running on a device controlled by a user, with the transaction request generated on the basis of a user input. The transaction can be, for example, an order to buy or transfer goods or funds (e.g. "order two apples"). In embodiments, the client is controlled by software executing a transaction in another context.

The method comprises the further step of
the client generating 12 and sending a transaction request 21 to the server, the transaction request 21 comprising the specification of the transaction and a transaction UUID identifying the transaction;

The client stores the transaction UUID, and in later steps, associates incoming messages accompanied by the UUID with the transaction identified by the UUID.

The step of generating 12 the request can already involve interactions with the server, for example checking whether goods to be ordered are available, or whether a user's account has sufficient funds to pay for the goods. This can be called business logic setup. In some cases, business logic setup may include the UUID.

The business logic setup typically can be used to make sure that the server-side part of the transaction has all required resources to maximize success of the final transaction request 21. It is optional because not every use case depends on it.

For instance, the business logic setup can be used to maintain a server-side session for the transaction. In the case of an e-commerce server, this could be the addition of one or more items to a shopping cart (associated with the UUID) so the final purchase request does not run into out-of-stock conditions. In this case, the business logic setup would be reserving stock items to the shopping cart. The transaction request 21 would be the final checkout.

After such application side or business side conditions have been checked and the transaction is, to a certain extent, ready to be executed from the business side, the client generates the transaction request 21.

The method comprises the further steps of
the client, after sending the transaction request 21 to the server, waiting 13 for a first timeout period, for the transaction confirmation request 22 sent by the server; optionally it can be the case that while waiting the client is
not being allowed to send a further transaction request with the same UUID;
the server, upon receipt of the transaction request 21, generating 31 and sending a transaction confirmation request 22 to the client, the transaction confirmation request 22 comprising the transaction UUID;

The step of generating 31 the transaction confirmation request 22 can involve the complete business logic setup. The server stores and tracks the transaction UUID and associates it with the server-side transaction result generated later on. In embodiments in which part of the business logic setup has already been accomplished by earlier interactions, as described above, a final check on the application or business side can be performed before generating the transaction confirmation request 22.

The server can reject the transaction request 21, for example, if not all server-side resources are available to proceed. For instance, if we want to pay 2000 USD to account X and we don't have enough on our own account.

Seen in the context of a business application, the steps leading up to the sending of the transaction confirmation request 22 are related to setting up the transaction from the business or application side. The remaining steps serve to coordinate the client device 1 and server computer 2 in a manner to ensure that the transaction is performed only once, in a processing step 33, and that both the client device 1 and server computer 2 are correctly informed about the result of the outcome.

The fact that the client receives the transaction confirmation request 22 lets the client know that the transaction request 21 was not lost in transmission. It further means that the client can count on the server to be responsible for following through on the transaction, and that the client can simply wait for the final result. The final result, as shown below, can be success or abort of the transaction.

In embodiments, sending the transaction confirmation request 22 is initiated by the client. For example, it is triggered by the client polling the server. Or the client monitors a corresponding status of the server and upon detecting a change in this status retrieves the transaction confirmation request 22, which involves the server sending the transaction confirmation request 22.

The method comprises the further steps of
the client, if receiving the transaction confirmation request 22 comprising the transaction UUID before the first timeout period has expired, generating 14 and sending a transaction confirmation response 23 comprising the transaction UUID, and subsequently waiting 15 for a transaction result message 24 comprising the transaction UUID from the server, and while waiting not being able to abort this transaction;
the client, if not receiving the transaction confirmation request 22 before the first timeout period has expired, aborting the client-side transaction request process associated with the transaction UUID;

In embodiments, the client sends another transaction request 21 with a different, second transaction UUID for the same order, and begins the same process for this second transaction UUID by waiting 13 for a first timeout period, for the transaction confirmation request 22 with the second transaction UUID.

The method comprises the further steps of
the client, if receiving the transaction confirmation request 22 after aborting the client-side transaction request process, not responding, to the server or sending an abort message to the server;
the server, after sending the transaction confirmation request 22 to the client, waiting 32 for a second timeout period, for the transaction confirmation response 23 sent by the client;

Before the client sends the transaction confirmation response 23, the client always is free to abort the transaction. If does, it can communicate this to the server by simply not sending the transaction confirmation response 23, which will cause the server to abort after the second timeout period has expired. Alternatively, it can communicate this to the server by sending an abort message to the server. In both cases, the server will then abort the server-side transaction corresponding to the transaction UUID.

After sending the transaction confirmation response 23, the client is not free to decide anymore. It must wait for the result of the server-side process. This will either be a transaction result message 24 or a server-side transaction abort message 25. The transaction result message is typically the final outcome, i.e. commit or abort.

The method comprises the further step of
the server, if receiving the transaction confirmation response 23 before the second timeout period has expired, processing 33 the transaction and sending the transaction result message 24 to the client;

Processing 33 the transaction typically involves committing server back-end transactions that were set up at a previous stage, such as when generating 31 the transaction confirmation request 22, and/or in preceding interaction steps.

In embodiments, sending the transaction result message 24 is initiated by the client. For example, it is triggered by the client polling the server. Or the client monitors a corresponding status of the server and upon detecting a change in this status retrieves the transaction result message 24, which involves the server sending the transaction result message 24.

The method comprises the further step of
the server, if not receiving the transaction confirmation response 23 before the second timeout period has expired, aborting 34 the server-side transaction process and sending a server-side transaction abort message 25 comprising the transaction UUID to the client;

Aborting 34 the server-side transaction process involves aborting backend processes or transactions required by the server-side transaction.

The method comprises the further step of
the client, if receiving the server-side transaction abort message 25, aborting 17 the client-side transaction request process;
the client, if receiving the transaction result message 24, processing 16 the transaction result message 24.

Analogous procedures in which sending a message is initiated by the receiving entity, as explained above for the transaction confirmation request 22 and the transaction result message 24, can be used in the sending of the other messages as well. For example, for the transaction confirmation response 23, and/or the server-side transaction abort message 25, etc.

In summary, the method for robust communication between a client 1 and a server 2, for performing a transaction, comprises the steps of the client 1 initiating, through a transaction request 21, a transaction to be performed by the server computer 2, waiting 13 for a transaction confirmation request 22 from the server computer 2, and when receiving the response, sending a transaction confirmation response 23. After sending the transaction confirmation response 23, the client device 1 is not free to abort the transaction but is forced to wait for and accept a transaction result message 24 from the server computer 2, or, in the case of a server-side failure, a server-side transaction abort message 25.

After sending the transaction request 21 and waiting for the transaction confirmation request 22, the client is not allowed to send another transaction request 21 with the same transaction UUID. This prevents the transaction to be executed multiple times by the server. However, if the client is not sure whether the transaction request 21 has reached the server, even before the timeout period for receiving the transaction confirmation request 22, the client can send another transaction request 21 with a different transaction UUID for the same order. If the transaction confirmation request 22 with the first UUID then does arrive, the client can abort this first transaction. Or, if the client over time receives the transaction confirmation request 22 for both transaction UUIDs, it can choose one of them to continue with, by sending the corresponding transaction confirmation response 23, and aborting the other transaction.

Generally, all the messages and states in the client and server associated with a transaction UUID are identified by that UUID. Several transactions can be handled in parallel, according to the method described, each being controlled by the messages with the corresponding transaction UUID.

After the step of processing 16 the transaction result on the client, side, the client can send a receipt message 26 comprising the transaction UUID to the server. After this, the server knows that the client knows about the result of the transaction, and thus the server can forget about the transaction.

While the invention has been described in present embodiments, it is distinctly understood that the invention is not limited thereto, but may be otherwise variously embodied and practised within the scope of the claims.

The invention claimed is:

1. A method for robust communication between a client and a server, for performing a transaction, the method comprising the steps of the client, based on user input, determining a specification of a transaction;

the client generating and sending a transaction request to the server, the transaction request comprising the specification of the transaction and a transaction UUID identifying the transaction;

the client, after sending the transaction request to the server, waiting for a first timeout period, for the transaction confirmation request sent by the server;

the server, upon receipt of the transaction request, generating and sending a transaction confirmation request to the client, the transaction confirmation request comprising the transaction UUID;

the client, if receiving the transaction confirmation request comprising the transaction UUID before the first timeout period has expired, generating and sending a transaction confirmation response comprising the transaction UUID, and subsequently waiting for a transaction result message comprising the transaction UUID from the server, and while waiting not being able to abort this transaction;

the client, if not receiving the transaction confirmation request before the first timeout period has expired, aborting the client-side transaction request process associated with the transaction UUID;

the client, if receiving the transaction confirmation request after aborting the client-side transaction request process, not responding, to the server or sending an abort message to the server;

the server, after sending the transaction confirmation request to the client, waiting for a second timeout period, for the transaction confirmation response sent by the client;

the server, if receiving the transaction confirmation response before the second timeout period has expired, processing the transaction and sending the transaction result message comprising the transaction UUID to the client;

the server, if not receiving the transaction confirmation response before the second timeout period has expired, aborting the server-side transaction process and sending a server-side transaction abort message comprising the transaction UUID to the client;

the client, if receiving the server-side transaction abort message, aborting the client-side transaction request process;

the client, if receiving the transaction result message, processing the transaction result message.

2. The method of claim 1, comprising, after the client has sent the transaction request to the server, and while the client is waiting for the first timeout period for the transaction confirmation request sent by the server, the client not being allowed to send a further transaction request with the same UUID.

3. The method of claim 1, comprising, prior to the step of the client generating and sending a transaction request, an interaction between the client device and the server computer for setting up at least part of a business logic.

4. The method of claim 3 where the interaction comprises the UUID.

5. The method of claim 1, comprising, prior to the step of the client generating and sending a transaction request, no interaction between the client device and the server computer for setting up at least part of a business logic.

6. The method of claim 1, comprising the step of the client, when waiting for the transaction confirmation request for the transaction UUID, aborting the transaction associated with the transaction UUID, and sending another transaction request with a different transaction UUID for the same order.

7. The method of claim 1, wherein the transmission of information between the client and the server is initiated by the receiving entity, by the receiving entity polling the sending entity.

8. The method of claim 1, wherein the transmission of information between the client and the server is initiated by the receiving entity, by the receiving entity monitoring a corresponding state of the sending entity and when detecting a change in this state that indicates that information is ready, retrieving the information from the sending entity.

9. A method for operating a client device, in which the client device performs the steps of the client, based on user input, determining a specification of a transaction;

the client generating and sending a transaction request to the server, the transaction request comprising the specification of the transaction and a transaction UUID identifying the transaction;

the client, after sending the transaction request to the server, waiting for a first timeout period, for the transaction confirmation request sent by the server;

the client, if receiving a transaction confirmation request comprising the transaction UUID before the first timeout period has expired, generating and sending a transaction confirmation response comprising the transaction UUID, and subsequently waiting for a transaction result message comprising the transaction UUID from the server, and while waiting not being able to abort this transaction;

the client, if not receiving the transaction confirmation request before the first timeout period has expired, aborting the client-side transaction request process associated with the transaction UUID;

the client, if receiving the transaction confirmation request after aborting the client-side transaction request process, not responding, to the server or sending an abort message to the server;

the client, if receiving a server-side transaction abort message, aborting the client-side transaction request process;

the client, if receiving the transaction result message, processing the transaction result message.

10. A method for operating a server computer, in which the server computer performs the steps of the server, upon receipt of a transaction request, generating and sending a transaction confirmation request to the client, the transaction confirmation request comprising the transaction UUID;

the server, after sending the transaction confirmation request to the client, waiting for a second timeout period, for a transaction confirmation response sent by the client;

the server, if receiving the transaction confirmation response before the second timeout period has expired, processing the transaction and sending the transaction result message to the client;

the server, if not receiving the transaction confirmation response before the second timeout period has expired, aborting the server-side transaction process and sending a server-side transaction abort message comprising the transaction UUID to the client.

11. A client device comprising a processor and a memory having computer-executable instructions stored thereupon which, when executed by the processor, cause:

the client device to, based on user input, determine a specification of a transaction;

the client device to generate and send a transaction request to the server, the transaction request comprising the specification of the transaction and a transaction UUID identifying the transaction;

the client device to, after sending the transaction request to the server, wait for a first timeout period, for the transaction confirmation request sent by the server;

the client device to, if the client device receives a transaction confirmation request comprising the transaction UUID before the first timeout period has expired, generate and send a transaction confirmation response comprising the transaction UUID, and subsequently wait for a transaction result message comprising the transaction UUID from the server, and while waiting not being able to abort this transaction;

the client device to, if the client device does not receive the transaction confirmation request before the first timeout period has expired, abort the client-side transaction request process associated with the transaction UUID;

the client device to, if the client device does receive the transaction confirmation request after aborting the client-side transaction request process, not respond to the server or send an abort message to the server;

the client device to, if the client device receives a server-side transaction abort message, abort the client-side transaction request process;

the client device to, if the client device receives the transaction result message, process the transaction result message.

12. A server computer comprising a processor and a memory having computer-executable instructions stored thereupon which, when executed by the processor, cause:

the server computer to, upon receipt of a transaction request, generate and send a transaction confirmation request to the client, the transaction confirmation request comprising the transaction UUID;

the server computer to, after sending the transaction confirmation request to the client, wait for a second timeout period, for a transaction confirmation response sent by the client;

the server computer to, if the server computer receives the transaction confirmation response before the second timeout period has expired, process the transaction and send the transaction result message to the client;

the server computer to, if the server computer does not receive the transaction confirmation response before the second timeout period has expired, abort the server-side transaction process and send a server-side transaction abort message comprising the transaction UUID to the client.

13. A non-transitory computer readable medium comprising computer readable program code encoding a computer program that, when loaded and executed on a client device, causes the client device to perform the steps according to claim 9.

14. A non-transitory computer readable medium comprising computer readable program code encoding a computer program that, when loaded and executed on a server computer, causes the server computer to perform the steps according to claim 10.

15. A method of manufacturing a non-transitory computer readable medium, comprising the step of storing, on the computer readable medium, computer-executable instructions which when executed by a processor of a client device, causes the client device or to perform the steps according to claim 9.

16. A method of manufacturing a non-transitory computer readable medium, comprising the step of storing, on the computer readable medium, computer-executable instructions which when executed by a processor of a server computer, causes the server computer to perform the steps according to claim 10.

17. A reproducible computer-readable signal encoding the computer program that, when loaded and executed on a client device, causes the client device to perform the steps according to claim 9.

18. A reproducible computer-readable signal encoding the computer program that, when loaded and executed on a server computer, causes the server computer to perform the steps according to claim 10.

19. A client-server system comprising one more client devices and one or more server computers;

each client device comprising a processor and a memory having computer-executable instructions stored thereupon which, when executed by the processor, cause:

the client device to, based on user input, determine a specification of a transaction;

the client device to generate and send a transaction request to the server, the transaction request comprising the specification of the transaction and a transaction UUID identifying the transaction;

the client device to, after sending the transaction request to the server, wait for a first timeout period, for the transaction confirmation request sent by the server;

the client device to, if the client device receives a transaction confirmation request comprising the transaction UUID before the first timeout period has expired, generate and send a transaction confirmation response comprising the transaction UUID, and subsequently wait for a transaction result message comprising the transaction UUID from the server, and while waiting not being able to abort this transaction;

the client device to, if the client device does not receive the transaction confirmation request before the first timeout period has expired, abort the client-side transaction request process associated with the transaction UUID;

the client device to, if the client device does receive the transaction confirmation request after aborting the client-side transaction request process, not respond to the server or send an abort message to the server;

the client device to, if the client device receives a server-side transaction abort message, abort the client-side transaction request process;

the client device to, if the client device receives the transaction result message, process the transaction result message;

each server computer comprising a processor and a memory having computer-executable instructions stored thereupon which, when executed by the processor, cause:

the server computer to, upon receipt of a transaction request, generate and send a transaction confirmation request to the client, the transaction confirmation request comprising the transaction UUID;

the server computer to, after sending the transaction confirmation request to the client, wait for a second timeout period, for a transaction confirmation response sent by the client;

the server computer to, if the server computer receives the transaction confirmation response before the second timeout period has expired, process the transaction and send the transaction result message to the client;

the server computer to, if the server computer does not receive the transaction confirmation response before the second timeout period has expired, abort the server-side transaction process and send a server-side transaction abort message comprising the transaction UUID to the client.

* * * * *